United States Patent [19]

Sinha et al.

[11] Patent Number: 4,517,243

[45] Date of Patent: May 14, 1985

[54] GLASS COATING COMPOSITION AND METHOD

[75] Inventors: Kamal R. Sinha, Millville; Brian E. Caldwell, Laurel Lake, both of N.J.

[73] Assignee: Wheaton Industries, Millville, N.J.

[21] Appl. No.: 486,104

[22] Filed: Apr. 18, 1983

[51] Int. Cl.$^3$ .................. B32B 17/10; B32B 27/28
[52] U.S. Cl. ............................. 428/336; 65/3.43; 65/3.44; 65/60.3; 427/372.2; 427/385.5; 427/389.7; 428/431; 428/440; 428/441; 428/442
[58] Field of Search .............. 428/431, 441, 440, 442, 428/336; 427/372.2, 385.5, 389.7; 65/60.3, 3.43, 3.44

[56] References Cited

U.S. PATENT DOCUMENTS

| | | | |
|---|---|---|---|
| 3,488,215 | 6/1970 | Shepherd | 428/441 |
| 3,939,108 | 2/1976 | Sirota | 428/441 |
| 3,959,539 | 5/1976 | Waggoner | 428/441 |
| 4,065,589 | 12/1977 | Lenard | 428/441 |
| 4,065,590 | 12/1977 | Salensky | 428/441 |
| 4,131,529 | 12/1978 | Osterloh | 428/441 |
| 4,168,345 | 9/1979 | de Massey | 428/441 |
| 4,250,068 | 2/1981 | Ali-Zaidi | 428/431 |

*Primary Examiner*—Ellis P. Robinson
*Attorney, Agent, or Firm*—Ratner & Prestia

[57] ABSTRACT

Method and coating composition for coating newly formed glass at relatively low temperature and without prior "hot-end" treatment. In this method, the composition is applied in a conventional manner by spray, dip, or roller coating, the composition comprising a carboxylic functional resin in dilute aqueous solution, the solution also including a crosslinking agent for the resin and a lubricity-imparting additive. The carboxylic functionality of the resin renders it water dispersible and also renders the finished coating receptive to conventional label adhesives, decorating printing, and so forth.

8 Claims, No Drawings

GLASS COATING COMPOSITION AND METHOD

BACKGROUND OF THE INVENTION

This invention pertains to a method and coating composition useful for coating glass so as to provide lubricity and abrasion resistance to the surface of the glass. More particularly, it pertains to such a method and composition suitable for application as a bare, freshly formed glass surface without pretreatment and particularly without a prior "hot-end" coating or treatment.

Due to the nature of raw glass surfaces, abrasion occurs whenever two such surfaces come in contact with each other or in contact with equipment used for handling a glass product. Any scratches or flaws in a glass surface may cause a decrease in strength of the glass to as little as one-fourth of its original value. Generally, glass articles of commerce, such as jars, fibers, tubes, pipes, bottles, tumblers, and the like are strongest when freshly formed. This strength decreases as the glass articles come into contact with each other and with other surfaces in the course of manufacturing, packaging, filling, and shipment.

It is, therefore, desirable for a glass surface to be coated with a composition having good lubricity and scratch or abrasion resistance properties. This decreases the likelihood of breakage, permitting more bottles, for example, to be handled by high-speed filling and packaging apparatus even though the glass surfaces will be subject to more contact with each other and with other surfaces, such as in glass to glass shrink wrapped bulk palletizing.

In the past, numerous types of such protective coatings have been developed. The compositions of such coatings include polyethylene waxes, acrylic-ethylene copolymers, complex stearates, fatty acids, and its derivatives, polyurethanes, vinyl copolymers, and silicones. Such coatings are generally applied after the glass is annealed and close to room temperature; therefore, these coatings are called "cold-end" coatings. One feature of all of these known "cold-end" coatings is that they are only effective in providing abrasion protection on glass surfaces that have been pretreated with a "hot-end" coating. Typically, hot-end coatings are formed by depositing a pyrolyzable titanium or tin compound, which chemically decomposes upon heating to form corresponding oxides of the metal, onto the glass surface while the surface is at a temperture above the pyrolyzing temperature of the compound (usually between 700°–1300° F.).

Such hot end coatings are applied soon after the article leaves the glass-forming machine and before it is cooled in the annealing lehr, after which one of the above-mentioned prior art types of "cold-end" coatings is applied. The "hot-end" surface treatment does not offer increased protection or lubricity when used by itself but merely alters the composition of the bonding surface and allows the prior art "cold-end" coatings to form a uniform durable film. Such pairs of "hot-end" and "cold-end" coatings have been in use for many years in the glass container industry. However, the use of "hot-end" surface treatment is an added expense and requires expensive exhaust systems with special stacks and scrubbers to remove the toxic and corrosive vapors produced from the decomposition products of "hot-end" coating compositions. In addition, these "hot-end" surface treatments have to be applied to bottles and containers in a manner such that the "finish" (i.e., the neck) of the bottle is untreated to avoid screw cap removal problems. Another problem commonly encountered in industry is an undesirable silvery appearance on "hot-end" treated ware due to an excess of the metal oxide deposit on the surface.

Certain of the prior art glass treating compositions have specific objectionable characteristics. For example, polyethylene waxes and silicones form a continuous hydrophobic surface on the glassware which is not receptive to conventional label adhesives and decorative inks and hence have to be removed prior to labelling, printing, or decorating. While the stearate soap type coatings are satisfactory from a lubrication and protection standpoint when immediately applied over "hot-end" treated bottles, such coatings are soluble in water and are removed when the ware is subjected to long term storage in humid atmospheres or prior to filling, autoclaving for sterilization, or retort processing or pasteurizing of filled ware.

It is apparent, therefore, that there is a significant need for a commercially practical method and composition by which a glass surface can be treated with a "cold-end" coating composition (i.e. without prior "hot-end" treatment), which provides desirable properties of durability, lubricity, clarity, and abrasion protection to glass and glassware. To the extent specific "cold-end" coatings have been proposed, significant problems, such as lack of clarity, are encountered with all such known coatings.

For example, oleic acid "cold-end" coating, deposited in vapor form may contaminate the glassware interior. (Internal contamination results when, during the application of the coating to the exterior surface of the glassware, a small amount of the coating enters the mouth of the glassware. Where the possibility of such contamination exists, it is essential that the coating ingredients be selected from materials in compliance with FDA regulations.) Poor label adhesion may also be experienced when an excess of the oleic acid is deposited on the glassware surface.

A mixture of polyvinylalcohol and polyoxyethylene stearate has apparently been used (proposed in U.S. Pat. No. 3,712,829) for coating ware without prior hot end coating. But this coating is suitable only where high abrasion resistance and permanent coating is not required.

A carboxyl functional polyamino acrylate ester resin crosslinked with a water soluble crosslinking agent such as epoxy or formaldehyde condensation resins and blended with carnuba wax and a silane coupling agent is claimed to provide abrasion protection to glassware with no hot-end pretreatment (in U.S. Pat. No. 4,224,365). However, this type of treatment requires a heavy coating thickness of about 10 to 25 microns and abrasion protection is minimal. Also the coating composition requires high temperature cure for several minutes which is not practical in many high speed glassware production lines.

In view of these problems, it is the object of this invention to provide a method and composition for applying an aqueous coating solution to glassware, which requires no prior "hot-end" pretreatment, and which produces a coating having desirable properties, at very low coating thickness, including clarity, lubricity, abrasion protection, permanency, resistance to hot water washing, autoclavibility, FDA compliance, and receptiveness to conventional label adhesives and decorating or printing inks.

It is also an object of this invention to provide a method and composition for applying an aqueous coating solution to glassware, with or without hot-end pretreatment which is useful on glassware adapted to be sterilized by dry-heat techniques (elevated temperatures without the presence of high humidity) at temperatures of up to 400° F. for 4 hours with no discoloration.

Another object of this invention is to provide an aqueous coating composition that can also provide abrasion protection to glassware subjected to an automatic dishwasher detergent wash.

A further object of this invention is to provide an aqueous coating composition that can be applied to glassware by conventional coating application methods such as spraying, roller or brush coating, and dipping.

BRIEF DESCRIPTION OF THE INVENTION

The foregoing objectives are met, in brief, by a method and coating composition, wherein the composition comprises a low molecular weight polymeric resin having functional carboxylic groups, a chemical crosslinking agent for the resin and a lubricious additive, all in solution, preferably aqueous solution, at a solids concentration of below 10% solids (gram solids per 100 cc solution). Preferred carboxylic functional resins include styrene-maleic anhydride copolymers (of the types sold by Arco Chemical Company, of Philadelphia, Pa., as "SMA" resins and by the Monsanto Company as Scriptset resins) and acrylic copolymeric resins or emulsions (of the type sold by the B. F. Goodrich Company, of Akron, Ohio, as "Carboset" resins and similar types commercially available from Rohm and Haas, Sybron, Polyvinyl Chemicals, Union Chemicals and the Johnson Wax Company). Combinations of the foregoing resins may also be used.

Preferably also, these resins are solublized in aqueous ammonia and combined with a crosslinking agent from the group consisting of polyvalent metal ions, such as zinc or zirconium ions, epoxy, polyethyleneimine, polyfunctional aziridines or formaldehyde condensation resins.

As lubricious additives, an agent selected from the group consisting of emulsified paraffinic wax, particularly polyethylene wax and/or fatty acid derivatives, such as stearates and oleates, are preferred. The lubricious additives may also serve as resin plasticizing agents.

For FDA compliance, the oxidized polyethylene lubricious additives should be used with acid values of less than 20. In all cases, dispersing agents used in these compositions are preferably volatile typical examples being aqueous ammonia and fugitive emulsifiers such as dimethylaminomethylpropanol for dispersing the lubricious additives.

In accordance with the method of the invention, coating compositions as described above, are applied in a dilute solution, preferably aqueous, by spraying, rolling, or dipping, and the water is then permitted to escape by volatilization from the coating with subsequent or contemporaneous crosslinking of the resin by the crosslinking agent included in the composition. The carboxylic functionality in the starting resin permits its aqueous dispersion and even after crosslinking provides a relatively hydrophilic surface for receptivity to decorating inks and labels.

The thickness of the resulting coating is generally less than 1/1000 inch and more commonly on the order of 500–5000 angstroms.

DETAILED DESCRIPTION OF THE INVENTION

In the present invention, a freshly formed glass article, such as a bottle, is removed from an annealing lehr and cooled below the annealing range to a temperature on the order of room temperature to 200° F. The outside surface of the glass article, while still bare and untreated, is then coated by means of a curtain overflow coating process, spraying, dipping, or roller coating. If the coated article is a bottle, for example, special care is taken to avoid the invasion of the interior thereof by the coating solution. This solution consists generally of a dilute aqueous solution of resin, including a crosslinking agent for the resin and a lubricious additive, the resin being selected so that in its crosslinked form, it retains some carboxylic functionality.

A particularly desirable binder resin for use in this invention is a low molecular weight, styrene maleic anhydride adduct copolymer available from Arco Chemical Company, under the trade name "SMA Resins". Such copolymers are available in styrene-maleic anhydride ratios of 1:1, 2:1, and 3:1, all of which are useful in the present invention. Scripset styrene-maleic anhydride resins sold by Monsanto may also be used. These resins are available with their carboxylic functionality in esterified or partially esterified form, including the disodium salt and the amide and ammonium salt forms. The average molecular weight of these resins varies from 10,000 to 50,000. All of these resins may be used in the present invention.

These resins may be neutralized by either strong or weak bases to form water soluble salts. Such solubilization occurs when the resin is dispersed in an ammonium hydroxide solution. While sodium hydroxide may also be used, ammonium hydroxide is preferred so that the film formed on application and drying is free of the neutralizing base due to evaporation of ammonia. Note that because of the carboxylic functionality of the resin, it is readily disperible as an aqueous solution. The remaining carboxylic functionality in the crosslinked form of the resin in the coating is also effective to render the coating relatively hydrophilic so that it is receptive to decorating inks and label adhesives.

Such resins are crosslinkable by zinc ions, for example, through the formation of an intermediate zinc ammonium complex producing a zinc salt of the resin as ammonia escapes. The proportion of crosslinking agent present will determine the degree to which the resin is crosslinked which will in turn determine the resistance of the coating to deterioration in water and to loss of clarity.

Permanent coatings which cure rapidly at low temperatures and which have excellent water resistance can be achieved with polyfunctional aziridines as a crosslinking agent. Good permanent coatings can also be achieved by crosslinking agents, such as epoxies and formaldehyde condensation resins. The latter, while they require a higher temperature cure, perhaps even above room temperature to the 200° F. range, provide good chemical resistance.

Other binder resins which may be used are the ionomers described in U.S. Pat. Nos. 3,264,272 and 3,836,386, as well as acrylic acid copolymers, styrene butadiene resins, styrene acrylic copolymers, such as those commercially available from the B. F. Goodrich Co. as Carboset resins. Still further, polyacrylamide vinyl/acrylic copolymers, and polyesters, all having some carboxylic functionality may also be used. Resins having some hydroxyl functionality may also be crosslinked and utilized in accordance with the present invention.

Where better alkali resistance is required, vinyl homopolymer and copolymer resins may be used as binder resins or blended with styrene, maleic anhydride, or other polymers.

Combinations of the foregoing resins may also be used.

The lubricious additives included in the composition of the present invention may be comprised of oxidized polyethylene (with an acid number of less than 20 to comply with FDA specifications for certain applications), and the oxidized polyethylene may be emulsified by conventional emulsifying techniques known in the art. It is preferable to use fugitive emulsifiers so that after application, the water sensitivity of the film is reduced. High melting polyethylenes are also preferable for high water resistance and autoclavibility. Polyethylene emulsions using non-oxidized polyethylenes may also be prepared by emulsion polymerization of ethylene. Fatty acid derivatives, such as ethylene bis-steramide, are difficult to emulsify by themselves. However, these may be more easily coemulsified with polyethylene. Other lubricating agents which may be solubilized in an aqueous base or water may also be blended directly with the binder resin without pre-emulsifying.

It is preferable to blend the binder resin with the lubricating agent, such as polyethylene or ethylene bis-oleamide, in a solids ratio of 80/20 to 70/30 respectively, although in some applications, lower lubricant ratios of 90/10 or higher lubricant ratios up to 40/60 may be desired. Still higher lubricant ratios may also be employed but the hot water resistance of the coating decreases significantly when the lubricant concentration in the coating exceeds 60%. If hot water resistance is not important in a specific application, coatings with good abrasion resistance may be formulated with higher lubricant concentrations.

Following are four examples in which bottles have been coated in accordance with the present invention:

EXAMPLE 1

Styrene-maleic anhydride copolymer—SMA 3000 (Arco Chemical Co.) powder was dissolved in aqueous ammonia using deionized water and 28% concentrated ammonium hydroxide at 2% solids. The pH was adjusted to 8.0–9.0. The solution was warmed to about 70° C. and stirred for about 1 to 2 hours until all the powder dissolved. A non-ionic emulsion of high density polyethylene wax with a softening point of 138° C. and acid value of 16 (Allied Chemical's AC 316), emulsified with ethoxylated nonyl phenol and other emulsifying agents, at 30% solids (available from Chemical Corporation of America, CHEMCOR, East Rutherford, N.J.) was diluted with deionized water to 2% solids solution. 70 parts by volume of the 2% SMA 3000 solution was mixed with 30 parts by volume of 2% emulsion 316 solution. 0.8 ml. of a solution of zinc ammonium carbonate containing 20% zinc oxide solids (available from Sherwin Williams Co.) was mixed with every 100 mls. of the blend prepared as above. All ingredients in this formulation are in compliance with applicable FDA food contact regulations.

EXAMPLE 2

A 1% solution of partially esterified styrenemaleic anhydride copolymer, SMA 2625 (Arco Chemical Co.), was dissolved in aqueous ammonia as described in Example 1. An anionic coemulsion prepared by emulsifying a high density polyethylene wax P.E.D. 121 (commercially available from American Hoechst) and ethylene bis-oleamide in the solids ratio of 9/1, respectively, using diethyl ethanolamine stearate as emulsifier, with total solids 25% (available from the Chemical Corporation of America under the trade name, Emulsion 267A) was diluted to 1% solids by adding deionized water. Seventy (70) parts by volume of the 1% SMA 2625 solution was mixed with twenty-five (25) parts by volume of 1% Emulsion 267A. 0.2 mils of a solution of ammonium zirconium carbonate containing 20% zirconium oxide solids (from Magnesium Elektron, Inc., Flemington, N.J. under the trade name of Bacote-20) was mixed in with every 100 mls. of this blend.

EXAMPLE 3

(For Better Detergent Resistance)

A 3% solids solution of SMA 3000 was prepared by dissolving SMA 3000 powder in aqueous ammonia as described in Example 1. A 3% solution of AC316 emulsion and a 3% solution of Emulsion 267A were also prepared as described in Example 1. Seventy (70) parts by volume of 3% SMA 3000 was mixed with fifteen (15) parts by volume of 3% Emulsion 316 and ten (10) parts by volume of 3% Emulsion 267A. Three (3) mls. of CX-100 polyfunctional aziridine crosslinking agent (Polyvinyl Chemicals, Inc.) was added per 100 mls. of blend. This composition includes minor amounts of a constituent (CX 100) not aproved by the FDA. If all FDA-approved constituents are required, the CX-100 in this example may be replaced by Beetle 65, a urea resin available from American Cyanamid and the applied coating cured at 400° F. for 5 minutes. These coatings provide good abrasion protection after an automatic detergent wash cycle.

EXAMPLE 4

A 40% dispersion of carboxylate acrylic copolymer neutralized with a volatile neutralizing agent such as ammonium hydroxide (Carboset 514H from B. F. Goodrich Co.) was diluted with ammonia water to 2% solids. Seventy-five (75) parts by volume of 2% 514H solution was mixed with twenty-five (25) parts by volume of 2% Emulsion 316 (as described in Example 1). 0.2 ml. of zirconium ammonium carbonate solution (BaCote-20 as described in Example 2) was added per 100 mls. of the blend.

Freshly-made pristine, borosilicate flint bottles with no pretreatment were coated with the coating compositions described in Examples 1 to 4. Coating was applied to the exterior surfaces of glass bottles by spraying, roller coating, and dip coating. The temperature of the surface of the bottles was about 100° F. The coated bottles were air dried at room temperature. For comparison, glass bottles with and without a titanium oxide "hot-end" pretreatment were coated with three commonly used prior art "cold-end" coatings:

(1) AP-4 (Ball Packaging) polyethylene based;
(2) Myrj 52S (ICI) stearate type;
(3) AP-5 (Ball Packaging) oleic acid.

Except for oleic acid which is applied by vapor deposition, the other bottles were roller coated and compared with no pretreatment bottles roller coated with the new inventive coating compositions.

Bottles treated as described above were tested with a scratch test machine to evaluate the effectiveness of the respective coatings. The scratch test machine (Ball Packaging—Glass Container Manufacturers Institute (GCMI)—bulletin 64) is designed to abrade the surface of one glass against the surface of a similar bottle. One bottle is fastened securely in a stationary lower set of chucks. The other bottle is fastened in the upper set of chucks which are positioned so that the axis of the bottles will be at 90° to each other. The test load is applied to the upper bottle which is driven at a constant speed in a direction 45° to the axis of each bottle. By this design, a fresh surface on one bottle is always contacted with a fresh surface of the other. After each pass, the bottles are examined for scratches and the force or load in pounds required to scratch the bottle is noted. The maximum load that could be applied to this unit was 75 lbs. The scratch protection was measured on coated bottles after: (1) autoclaving at 121° C. for sixty minutes at 15 psi; (2) washing in an automatic dishwasher without detergent; (3) washing in a an automatic dishwasher with "Cascade" detergent; and (4) dry heat sterilization at 400° F. for 4 hours.

Since this scratch test simulated relatively mild abuse of glassware, another abrasion test was also devised to simulate more severe abuse. A bottle was placed on its side on a scale, and another bottle held in hand by its mouth and base was placed over the bottle lying on the scale so that the axis of the bottles were at 90° to each other and rubbed by sliding back and forth. The force exerted by hand was increased until a scratch was observed and the force noted on the scale. This type of abrasion testing produces scratches at a lower force than indicated by the Ball Scratch tester since the surface of one bottle is not always abrading with a fresh surface of the other bottle. The abrasion test results are shown in Table 1.

Another property that was measured was lubricity. Lubricity is measured by determining the angle at which the top bottle in a pyramid of three bottles, on their sides, will start to slide when the support is tilted. Untreated bottles will reach an angle of 35° to 40° before sliding. A good lubricious surface will permit a dry bottle to slide at about 8° to 16°. Lubricity measured on bottles with no pretreatment and coated with the new inventive coating compositions described herein were found to be within the range of 8° to 14°.

TABLE 1

| | Number of Pounds to Produce Scratch | | | | | | | |
| | Initial | | Dishwasher Wash - No Detergent | | Dishwasher Wash - With Detergent | | After Autoclave | |
| | Ball Scratch Tester | Hand Scratch Test | Ball Scratch Tester | Hand Scratch Test | Ball Scratch Tester | Hand Scratch Test | Ball Scratch Tester | Hand Scratch Tester |
|---|---|---|---|---|---|---|---|---|
| Untreated Bottles | 5 | 2 | 5 | 2 | 5 | 2 | 5 | 2 |
| Titanium/AP-5 | 75+ | 40 | 75 | 10 | 45 | 2 | 65 | 10 |
| AP-5 | 10 | 2 | 10 | 5 | 5 | 1 | 5 | 1 |
| Titanium/AP-4 | 75+ | 30 | 40 | 10 | 40 | 5 | 75+ | 15 |
| AP-4 | 25 | 5 | 5 | 1 | 5 | 1 | 10 | 1 |
| Titanium/MYRJ-52S | 75+ | 30 | 75 | 8 | 45 | 6 | 75+ | 10 |
| MYRJ-52S | 35 | 10 | 5 | 1 | 5 | 1 | 10 | 2 |
| Example 1 | 75+ | 55 | 75+ | 65 | 10 | 2 | 75+ | 35 |
| Example 2 | 75+ | 60 | 75+ | 65 | 20 | 2 | 75+ | 40 |
| Example 3 | 75+ | 70+ | 75+ | 65 | 75 | 35 | 75+ | 60 |
| Example 4 | 75+ | 40 | 75+ | 35 | | | 75+ | 35 |

The above results demonstrate the superior abrasion protection and durability of the new inventive coating compositions applied over untreated bottles as compared to prior art "cold-end" coatings applied over treated and untreated bottles. Dry heat sterilized bottles exposed to 400° F. for 4 hours using Example 1 coating showed a hand abrasion of 60 lbs. as compared to titanium/AP-5, titanium/AP-4 and titanium/MYRJ-52S coated bottles varying from 5-15 lbs.

The hydrophilic nature of the carboxylic functionality of the resin in the coatings of the present invention, which represents a substantial portion of the coating composition, provides a surface that is compatible with conventional label adhesives and printing inks used on glassware. Label adhesion tests conducted with pressure sensitive labels with adhesives based on rubbers and acrylics and on bottles with no coating and bottles coated with the inventive coating composition described herein were tested at 120° F. and high humidity conditions. No differences in adhesion was noted between uncoated and coated bottles. Slight improvement in adhesion was noted for coated bottles under high humidity conditions as compared to uncoated bottles.

The crosslinking reaction of the carboxylated resins with polyvalent metal ions as described herein is ionic in nature and is not temperature dependent. Therefore, no heat is specifically required to cure these coatings. The crosslinking reaction proceeds as the volatile neutralizing agent, such as ammonia, escapes from the thin coating applied on the bottle surface. Crosslinking with CX-100 polyfunctional aziridine also proceeds rapidly at ambient temperatures.

It is preferable to use resin concentrations of 1-5% solids in the coating compositions of the present invention, although higher total solids concentration can also be used. The coating thickness on bottles coated in accordance with the present invention, at 1-5% SMA resin solid concentration was estimated by microscopy and by a thickness measurement instrument with a sensitivity of 50 angstroms based on a mechanical stylus (Alfa Step Profiler from Tencor Instruments, Mountain View, Calif.). The coating thickness thus measured varied from 500 to 5,000 angstroms.

While this invention has been described with reference to specific embodiments thereof, it is not limited thereto, and the appended claims are intended to be construed to encompass the present invention in all of its forms and embodiments as may be devised by those skilled in the art.

We claim:

1. A glass product having a continuous hydrophilic, water insoluble, abrasion-resistant, protective coating thereon, said coating consisting essentially of from 20% to 95%, by weight, of a cross-linked styrene-maleic anhydride copolymer and from 5% to 80%, by weight, of a lubricious inclusion.

2. The product of claim 1, wherein said copolymer has a ratio of styrene to maleic anhydride of from 1:1 to 3:1.

3. The coating of claim 1 wherein the coating has a thickness of from 500 to 5,000 angstroms.

4. The glass product in accordance with any one of claims 1–3, wherein said lubricious inclusion is paraffinic wax, polyethylene wax, or fatty acid derivative.

5. A method of making a glass product with a continuous hydrophilic, water resistant, protective coating thereon, said method comprising forming said product from molten glass, cooling said product to below the annealing temperature thereof, and applying to the outer surface of said cooled product a coating solution consisting of an aqueous solution of 0.1–20%, by weight, of total solids; said solids consisting essentially of from 20% to 95%, by weight, of a styrene-maleic anhydride copolymer and from 5% to 80%, by weight, of a lubricious inclusion, said copolymer including a cross-linking agent in an amount sufficient to effect cross-linking thereof upon removal of water therefrom, and permitting the water of said solution to vaporize and said polymer to be cross-linked by said cross-linking agent.

6. Method, as recited in claim 5, wherein said product is cooled to a temperature in the range of room temperature to 200° F. and said coating solution is applied to said product while it is at a temperature in that range.

7. The glass product of claim 1 wherein the lubricious inclusion is a polyethylene wax.

8. A method as in claim 5 wherein the outer surface to which the coating solution is applied is bare.

* * * * *